United States Patent Office.

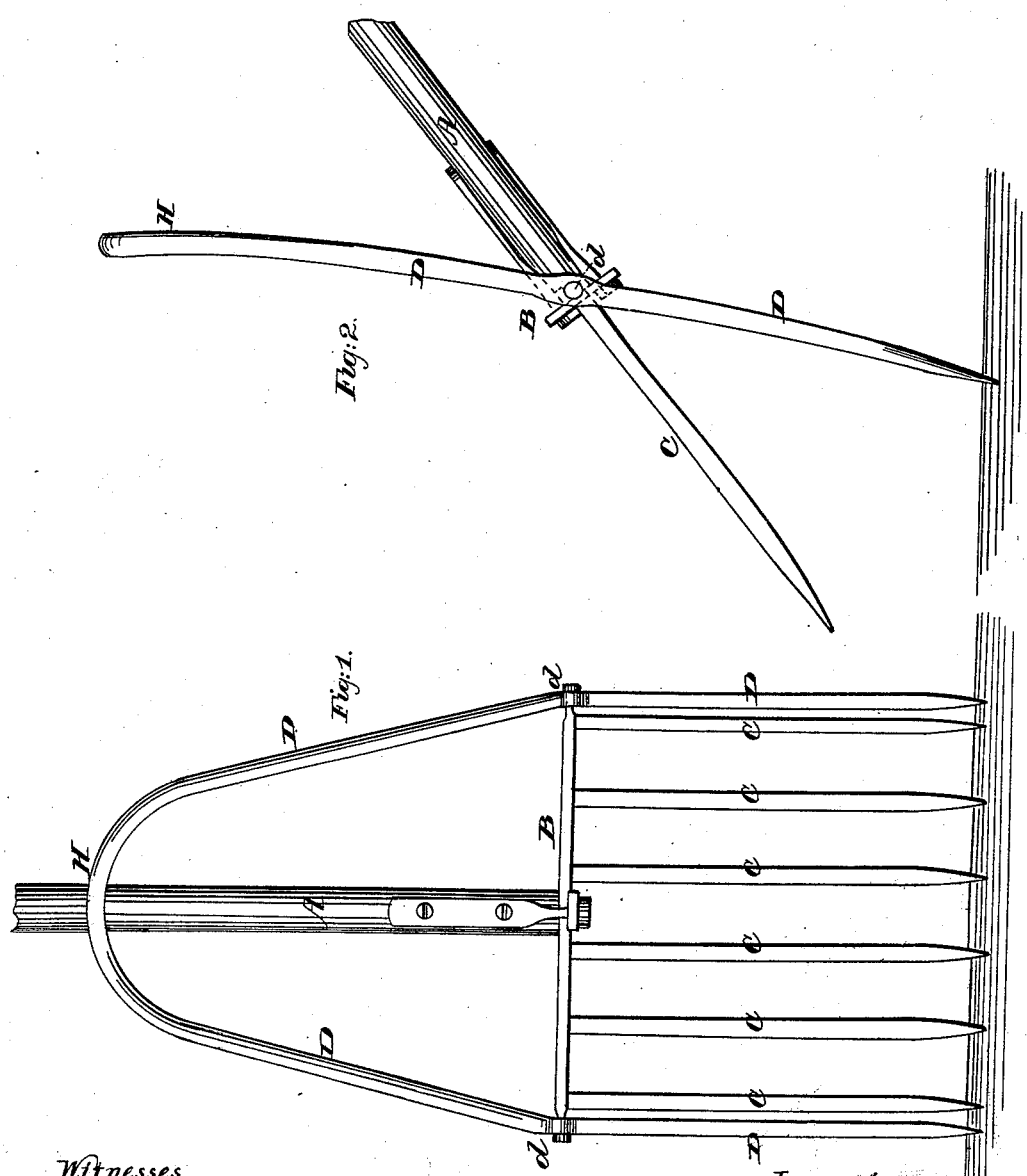

GEORGE MEADER, OF PRAIRIE CENTRE, ILLINOIS.

Letters Patent No. 65,583, dated June 11, 1867.

IMPROVEMENT IN POTATO-DIGGERS.

*The Schedule referred to in these Letters Patent and making part of the same.*

TO ALL WHOM IT MAY CONCERN:

Be it known that I, GEORGE MEADER, of Prairie Centre, in the county of La Salle and State of Illinois, have invented a new and useful Improvement in Potato-Diggers; and I do hereby declare and make known that the following is a full, clear, and exact description of the same, reference being had to the accompanying drawings, and the letters and figures marked thereon, which form part of this specification.

My invention consists in a novel implement which may be used with equal advantage for digging potatoes and other vegetables, and for pulverizing and spading up the soil of gardens and fields to prepare the ground for the crops.

To enable those skilled in the art to make and use my invention, I will now proceed to describe the same with particularity, making reference in so doing to the aforesaid drawings, in which—

Figure 1 represents a front elevation of my invention; and

Figure 2 is a side elevation of the same.

Similar letters of reference in the different figures denote the same parts of my invention.

A represents a handle similar to the handle of a spade or shovel, which is secured in any suitable manner to a cross-bar, B, to which are secured the teeth C, forming a broad fork, as shown in fig. 1. D D represent two standards, which are arranged upon each side of the fork, and extending above the fork unite at H, forming a handle, which is grasped when in use by the left hand of the operator, the handle A being grasped in his right hand. The cross-bar B projects each way and passes through suitable holes at $d$ in the said standards D D, thereby forming a fulcrum upon which the fork could be operated as desired, and as shown in fig. 2. The implement is forced into the earth, when the teeth C and standards D are parallel with each other, and when the teeth are entered to a sufficient depth, the standards D are held firmly in position by one hand, while the handle A is forced down with the other, and turning upon the fulcrum or hinge at $d$, the fork is raised up as shown in fig. 2, thus throwing out the potatoes or other vegetables, the soil falling back through between the tines C. If used as a pulverizer, the same operation would effect the desired result. When designed for this purpose, a spade or shovel blade might be used in place of the fork tines substantially in the same manner. The pivots $d$ may be prolongations of the cross-bar B, or they may be attached to the outer tines at any desired point, entering the standards at points varied accordingly. The standards D might also unite just above the cross-bar B, and be provided with a single shank or handle parallel to the handle A, if desired.

Having described the construction and operation of my invention, I will now specify what I claim as new, and desire to secure by Letters Patent:

I claim the combination of the standards D and the fork C or its equivalent, provided with suitable handles, and arranged and operating substantially as and for the purposes specified.

GEORGE MEADER.

Witnesses:
W. E. MARKS,
L. L. COBURN.